3,050,563
Patented Aug. 21, 1962

3,050,563
α-SUBSTITUTED VINYL SULFIDES AND THEIR PREPARATION
Henry J. Schneider, Hatboro, Pa., assignor to Rohm & Haas Company, Philadelphia, Pa., a corporation of Delaware
No Drawing. Filed Aug. 1, 1960, Ser. No. 46,358
23 Claims. (Cl. 260—609)

This invention deals with a method for preparing vinyl sulfides in which the α-carbon of the vinyl group is substituted.

More particularly, this invention is concerned with a process employing a base-catalyzed elimination technique in the presence of acetylene to give excellent conversions in the preparation of α-phenyl vinyl sulfides and ketene mercaptals from bis-sulfides.

The preparation of vinyl sulfides by the base-catalyzed reaction of acetylene with a mercaptan, preferably in the liquid phase by virtue of the presence of solvents such as alcohols, has been disclosed by Reppe et al. in U.S. Patent 2,081,766. The scope of that synthesis is, however, somewhat limited by a number of factors among which the more important ones that are pertinent to the present invention are:

(1) The tendency of the vinyl sulfide group to react with a number of chemical species, particularly mercaptans. For example, it is well known in the art that 1,2-bis-alkylthio (or alkyl mercapto) ether can be prepared by a simple addition of a mercaptan to a vinyl sulfide. One of the objects of the present invention is to prevent this addition by the presence of acetylene in the reaction.

(2) Of even greater importance is the inability to obtain terminal vinyl groups by reaction of substituted acetylenes with mercaptans. This has been shown by Truce et al., J.A.C.S. 78, 695 (1956), who determined that under these conditions a vinyl sulfide with internal unsaturation is obtained.

These limitations are, in the main, overcome by using acetylene as a "blocking agent" and, as a result, the present invention has made possible a large number of vinyl sulfides with highly useful properties.

The use of acetylene as a "blocking agent" has reference to a technique whereby a catalytic amount of base is employed to eliminate a nucleophilic anion which is simultaneously reacted with acetylene. Acetylene is the essential factor in the reaction sequence providing the key to completion of the synthesis in substantially quantitative conversions and yields as will be demonstrated below.

Illustrative of the types of vinyl sulfides which can be prepared by the present method are the following compounds:

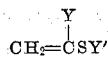

in which, when Y and Y' are represented by various moieties may form the following compounds:

TABLE 1

|  | Y | Y' |
|---|---|---|
| Formula 1 |  | Alkyl | (¹) |
| Formula 2 |  | Aryl | (¹) |
| Formula 3 |  | Aralkyl | (¹) |
| Formula 4 |  | SQ— | (¹) |

¹ In all of the above four typical compositions Y'=Q=an alkyl, aryl, or aralkyl moiety, or an OH— or an amino derivative thereof.

The compounds as outlined in Table 1 are obtained by the reaction of compounds having the general formula

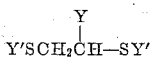

with acetylene in the presence of a strongly basic catalyst dissolved in alcohol. In this formula, Y and Y' have the values given in Table 1.

In accordance with the present invention, α-phenylvinyl sulfides (also termed α-styryl thioethers), delineated by Formula 2, are prepared by the base-catalyzed elimination of a mercaptan moiety in the presence of acetylene as typified by Equation 1, Examples 1 and 2, and the data in Table 2 which follow:

(1)
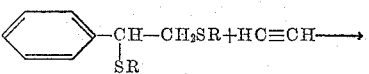

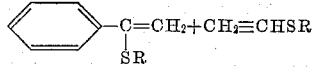

Compound I   Compound II in which R may be an alkyl group of $C_1$–$C_{18}$ length, a phenyl or substituted phenyl group, or an hydroxyethyl group.

Example 1

A solution of 1-phenyl-1,2-bis(ethylthio)ethane (93 g., 0.41 mole) in t-butanol (50 ml.) containing dissolved potassium metal (1.6 g., 0.041 mole) was charged to a 240 ml. magnetically stirred autoclave. The gas space was swept with nitrogen and acetylene, and the reactor and contents were heated to 100° C. Acetylene (11 g., 0.423 mole) was pressed in from a calibrated reservoir over a period of 35 minutes.

Light ends were removed from the crude reaction product (144 g.), leaving a semi-solid residue. Water (30 ml.) was added to dissolve the precipitated alkoxide. The water layer was separated and washed with ether (three times with 30 ml. of ether each time). The organic layer, the ether extracts and the flash distillate were recombined and distilled through a Vigreux column to give α-(ethylmercapto)styrene (60 g., 0.37 mole, 89 percent yield) as water-white, mobile liquid, B.P. 69° C./1.5 mm., $n_D^{25}$, 1.5742, $d_{25}^{25}$, 1.0187

Calc. for $C_{10}H_{12}S$: C, 71.95; H, 7.36; S, 19.52; $M_D$, 52.31. Found: C, 73.08; H, 7.60; S, 19.67; $M_D$, 53.38.

The structure of the α-(ethylthio)styrene was confirmed by infra-red analysis.

Example 2

Iodine (4 g.) was added to a heterogeneous mixture of dithiodiglycol (commercial grade, $n_D^{25.2}$, 1.5632) and styrene (plant grade, inhibited, 215 g. 2.06 moles). The mixture was stirred rapidly for a period of seven days at room temperature. Additional increments of iodine (2 g.) were added after 5 hours and 13.5 hours. The mixture slowly became homogeneous. The reaction product was a dark brown viscous liquid with a small amount of solids (14 g.) which was removed by filtration. The solid material was insoluble in ethanol. The liquid filtrate (500 g.), which was soluble in ethanol, was stirred with KOH pellets (5 g., 0.089 mole) for 2 hours, during which time the color changed from brown to yellow-white. After another filtration to remove the inorganic solids, the crude bis-sulfide (487 g.) was added to a solution of potassium metal (7.8 g., 0.2 mole) in t-butanol (200 ml.).

The solution was contacted with acetylene (330–450 p.s.i.g.) in a 1-liter stirred autoclave. Over a period of five hours, the reaction mixture absorbed 42 grams (1.61 moles of acetylene). The crude reaction product (638 g.) was flash distilled to give a yellow distillate (451 g., B.R. to 122° C./1.45 mm., pot temperature <187° C.) and a viscous, brown residue (180 g.). The flash distillate was redistilled into small fractions in a modified Claisen to give (a) 2-hydroxyethyl vinyl sulfide (68 g., 0.65 mole, 32 percent yield) and (b) α-(2-hydroxyethylmercapto)styrene (117 g., 0.64 mole, 32 percent yield) as a light yellow liquid, B.P. 90–91° C./0.07 mm., $n_D^{25}$ 1.5908.

TABLE 2

The following data were obtained by reactions like that exemplified in Equation 1 above, following detailed methods such as are typically shown in Examples 1 and 2. They indicate that essentially any α-phenylvinyl sulfides may be prepared by the general method of this invention if the corresponding "bis-sulfides" were available and not disposed to causing side reactions.

| R-in Compound I | Solvent | Time (mins.) | Temp. (° C.) | Yield of Compound II, percent |
|---|---|---|---|---|
| $CH_3^-$ | t-butyl alcohol | 133 | 102–143 | 60.0 |
| $CH_3^-$ | ethyl alcohol | 233 | 78–103 | 52.9 |
| $C_2H_5^-$ | t-butyl alcohol | 103 | 127–158 | 50.5 |
| $C_2H_5^{-*}$ | ----do---- | 47 | 98–108 | 89.0 |
| $HOCH_2CH_2^{-**}$ | ----do---- | 300 | 95–105 | 25.0 |
| $C_6H_5^-$ | ----do---- | 108 | 101–114 | 56.3 |

In all cases the catalyst employed was 10 mole percent potassium alkoxide.
\* From Example 1.
\*\* From Example 2.

The temperature range within which satisfactory results are most likely to be obtained is 80°–150° C. A preferred range, however, is 90–110° C. Because of the relatively high boiling points of the starting materials the reaction can be made to go at substantially atmospheric pressure, or at least at an acetylene pressure of no more than about 5 p.s.i.g. In most cases it might be more convenient to employ about 50 p.s.i.g., particularly if it is desired to carry out the reaction in a pressure reactor. For production purposes, where it is desired to attain maximum efficiency in rates of reaction, a pressure of between 200 and 500 p.s.i.g. will be found to be preferable.

For simplicity of explanation and understanding, the preparation of α-substituted vinyl sulfides of the typical compositions of Formulas 1, 2 and 3 by the method of the present invention may be described as proceeding in two distinct but simultaneous chemical steps, as indicated above. One is the base-catalyzed elimination reaction, and the other is the base-catalyzed vinylation of the eliminated species. These steps may be illustrated by Equations 2 and 3 which follow:

(2)
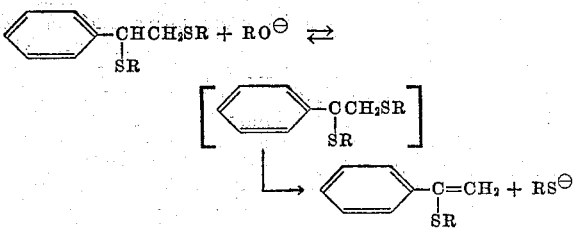

(3)   $RS^- + HC\equiv CH + ROH \rightarrow RSCH=CH_2 + RO^\ominus$

The criticality of acetylene in the present invention is evidenced by comparison of Example 1 with Example 3 which follows:

*Example 3*

PART A (WITHOUT ACETYLENE)

Ethyl mercaptan (18.3 g., 0.295 mole, 72.5% of theoretical) was distilled from a solution of 1-phenyl-1,2-bis(ethylthio)ethane (92 g., 0.407 mole) in octanol-1 (50 ml., $n_D^{25}$, 1.4275) containing dissolved potassium (1.6, 0.041 mole). The distillation was conducted with a nitrogen sweep. The mercaptan did not distill until the reaction temperature reached 171° C. The ethyl mercaptan was collected in aqueous sodium hydroxide, and the distillation was continued to the boiling point of octanol-1 (180° C. in overhead, pot temperature, 217° C.). The ethyl mercaptan was isolated by acidification of the aqueous caustic after extraction with ether to recover the distilled octanol-1. No losses were sustained on the distillation.

All organic materials other than the ethyl mercaptan were recombined with the distillation residue and flash distilled in vacuo to a dry pot. After recovery of the ether and octanol-1, α-(ethylthio)styrene (21 g., 0.128 mole, 31.5% of theoretical) was obtained.

PART B (WITHOUT ACETYLENE)

In another experiment, when 1-phenyl-1,2-bis-(ethylthio)ethane (0.41 mole) was heated in a closed reactor with potassium butoxide (0.041 mole) in t-butanol, no acetylene being present, α-(ethylthio)styrene was obtained in 9.0% conversion, this being approximately the quantity of catalyst employed. The greater portion (87%) of the bis-sulfide was recovered unchanged.

The present invention also provides an improved method for preparing ketene mercaptals which are near relatives to the vinyl sulfides. Actually, they are a special series of α-substituted vinyl sulfides. The present invention drives the base-catalyzed elimination of a tris-sulfide to completion as illustrated in Equation 5:

(5)
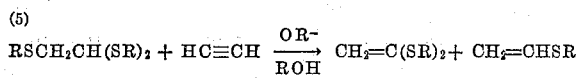

in which R is the same as in Equation 1. Where R, for example, is n-butyl, the 1,1,2-tris-(n-butylthio)ethane is prepared by the reaction of n-butyl vinyl sulfide and n-butyldisulfide in the presence of iodine as a catalyst. That process is the subject of another patent application which I have filed simultaneously with the present case.

The important role of acetylene in this reaction will be seen by reference to the work of H. C. Volger and J. F. Arens, as reported in Rec. Trav. Chim. 76, 847 (1957). Using greater than stoichiometric amounts of base, and without acetylene, they obtained the products as indicated in Equation (6):

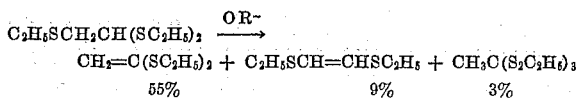

This comparison, showing how the use of acetylene makes possible the use of catalytic amounts of base and greater conversions than when stoichiometric amounts are employed, is further illustrated by Example 4, in which 1,1,2-tris(n-butylthio)ethane is employed as the starting material.

*Example 4* n-Butylmercaptoacetaldehyde di-n-butyl mercaptal (467 g., 1.59 mole) and a solution of potassium metal (6.2 g., 0.159 mole) in t-butanol (125 ml.) were charged to a 1-liter stirred autoclave. The gas space was flushed with nitrogen and acetylene. The mixture was heated to 120° C. and acetylene (61 g., 2.34 moles) was pressed in from a calibrated reservoir over a period of 1.25 hours. The reaction was exothermic.

The dark colored reaction mixture was flash distilled into a Dry-Ice acetone cooled receiver to give a light yellod distillate (577 g.; B.P. 110° C./0.75 mm., pot temperature, 158° C.) and a dark brown solid residue (29 g.).

After removal of t-butanol and t-butyl vinyl ether, n-butyl vinyl sulfide 177 g., 1.52 moles, 96% yield, B.P. 54.8° C./32 mm. −53° C./29 mm., $n_D^{25}$ 1.4714 was obtained. A small (1 g.) intermediate fraction was removed and ketene di-n-butyl mercaptal (299 g., 1.46 mole, 92% yield, B.P. 60.5° C./0.07 mm., $n_D^{20}$ 1.5103, $n_D^{25}$ 1.5077, $d_{20}^{20}$ 0.9562, $d_{25}^{25}$ 0.9538) was obtained as a white, mobile liquid.

Calc. for $C_{10}H_{20}S_2$: C, 58.76; H, 9.86; S, 31.37; $M_D$, 63.91. Found: C, 58.85; H, 9.76; S, 30.96; $M_D$, 64.10.

The process described herein above can conveniently be carried out in a stirred autoclave or in a coil reactor both of conventional design. In the latter instance it is possible optionally to inject the acetylene, the solvent, etc., into various points along the coil, or pump all the reactants through the entire coil under pressure.

Highest conversions or yields are obtainable with this process when a strong base, such as an alkoxide or stronger, is used in catalytic amounts. The catalytic amounts of base which work successfully in the present invention range from as little as 0.1 mole percent to as much as 50 mole percent, based on the starting material. At the lower end of this range the reaction goes more slowly, and it may therefore be desirable to employ a little more in certain cases. At the upper end the sole objection may be that the excess of base over the needed quantity is wasted, since the reaction can be made to go to completion quite rapidly with much less base. An optimum range is from 1 to 20 mole percent. These ranges compare favorably with the 100 mole percent or more required in the prior art stoichiometric reaction. Even more important is the fact that substantially no side reactions occur when the catalytic amounts of base are employed, whereas various undesirable side reactions occur with stoichiometric amounts.

The α-substituted vinyl sulfides prepared by the present invention are useful, polymerizable monomers, particularly since they are unusually electron-rich. Various homopolymers and copolymers can be formed therefrom, using about 0.5 to 10.0 mole percent of the monomer. One of the most important features of the α-substituted vinyl sulfides is the fact that they contribute to such polymers the property of thermal-oxidative stability. The various products of this invention have other advantages, and find particular utility in textile finishing, leather, paper, and in the coating art. They can also be formulated to give additives for fuel oils and lubricating oils.

I claim:

1. Process for the preparation of α-arylvinyl sulfides, having the formula

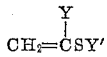

in which Y is selected from the class consisting of lower alkyl, benzyl and phenyl groups, and Y' is selected from the class consisting of lower alkyl, hydroxy lower alkyl, benzyl and phenyl groups, comprising, reacting a compound of the formula

Y'S—CH₂—CHSY' in which Y and Y' have the values defined above, with acetylene in the presence of a catalyst, whose basicity is at least as strong as that of an alkoxide, dissolved in alcohol.

2. Process for the preparation of

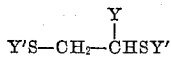

comprising, reacting

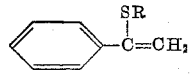

with acetylene in the presence of a catalyst, whose basicity is at least as strong as that of an alkoxide, dissolved in alcohol, the R in both formulas being selected from the class consisting of lower alkyl, hydroxy lower alkyl, benzyl and phenyl groups.

3. Process of claim 2 in which R is a methyl group.
4. Process of claim 2 in which R is an ethyl group.
5. Process of claim 2 in which R is an hydroxyethyl group.
6. Process of claim 2 in which R is a phenyl group.
7. Process of claim 1 in which the catalyst is present in an amount ranging from 1 to 20 mole percent.
8. Process of claim 1 in which the reaction is carried out at an average temperature in the range of from about 80° to about 150° C.
9. A composition of matter having the formula

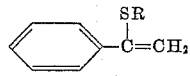

in which R is selected from the class consisting of alkyl groups of $C_1$ to $C_{18}$ length and hydroxy and amino derivatives thereof.

10. The composition of claim 9 in which R is a methyl group.
11. The composition of claim 9 in which R is an ethyl group.
12. The composition of claim 9 in which R is an hydroxyethyl group.
13. Process for the preparation of ketene mercaptals, having the formula $$CH_2 = \overset{Y}{\underset{|}{C}} SY'$$

where Y=SQ and Q=Y', Y' being selected from the class consisting of lower alkyl, hydroxy lower alkyl, benzyl and phenyl groups, comprising, reacting a compound of the formula $$Y'S—CH_2—\overset{Y}{\underset{|}{C}}HSY'$$

where Y and Y' have the values defined above, with acetylene in the presence of a strongly basic catalyst dissolved in alcohol, the basicity of the catalyst being at least as strong as that of an alkoxide.

14. Process for the preparation of ketene mercaptals having the formula

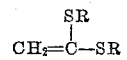

comprising, reacting

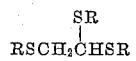

with acetylene in the presence of a catalyst, whose basicity is at least as strong as that of an alkoxide, dissolved in alcohol, the R in both formulas being selected from the class consisting of lower alkyl, hydroxy lower alkyl, benzyl and phenyl groups.

15. Process of claim 14 in which R is a methyl group.
16. Process of claim 14 in which R is an ethyl group.
17. Process of claim 14 in which R is a butyl group.
18. Process of claim 14 in which R is a hydroxyethyl group.
19. Process of claim 14 in which R is a phenyl group.
20. Process of claim 13 in which the catalyst is present in an amount ranging from 1 to 20 mole percent.
21. Process of claim 2 in which R is a benzyl group.
22. The composition of claim 9 in which R is a butyl group.
23. The composition of claim 9 in which R is a benzyl group.

No references cited.